United States Patent
Nakamura

[11] Patent Number: 6,034,724
[45] Date of Patent: Mar. 7, 2000

[54] IMAGING DEVICE UTILIZING A LINE-CRAWLING CORRECTION COEFFICIENT

[75] Inventor: Hideo Nakamura, Suwa, Japan

[73] Assignee: Chinon Kabushiki Kaisha, Nagano, Japan

[21] Appl. No.: 08/792,792

[22] Filed: Feb. 3, 1997

[30] Foreign Application Priority Data

Feb. 29, 1996 [JP] Japan ................................. 8-043422

[51] Int. Cl.$^7$ ................................................. H04N 5/217
[52] U.S. Cl. ..................... 348/241; 348/247; 348/607; 348/615
[58] Field of Search ................................... 348/266, 272, 348/273, 276, 277, 280, 222, 241, 607, 246, 247, 615, 616

[56] References Cited

U.S. PATENT DOCUMENTS

| | | | |
|---|---|---|---|
| 4,450,475 | 5/1984 | Ishikawa et al. | 358/44 |
| 5,268,758 | 12/1993 | Nakayama et al. | 358/162 |
| 5,359,369 | 10/1994 | Izawa et al. | 348/672 |
| 5,541,648 | 7/1996 | Udagawa et al. | 348/222 |
| 5,719,624 | 2/1998 | Sasaki et al. | 348/231 |
| 5,754,227 | 5/1998 | Fukuoka | 348/232 |

*Primary Examiner*—Wendy Garber
*Assistant Examiner*—M. White
*Attorney, Agent, or Firm*—Hickman Stephens & Coleman, LLP

[57] ABSTRACT

A method and an apparatus are provided for eliminating a line-crawling phenomenon caused by nonuniformity in photosensitive characteristics of light-receiving pixels disposed in a color imaging device. A pixel signal (S) output from a color imaging device (2) is converted by a sample-and-hold circuit (4) and an A/D converter (6) into pixel data (P) so as to be stored in an image memory (8). An arithmetic unit (12) multiplies luminance data formed on the basis of each pixel data (P) by a line-crawling correction coefficient (LC) stored in a nonvolatile memory (10), for example, so as to form and output luminance data (V) which is substantially equivalent to that obtained when the light-receiving pixels have a uniform photosensitive characteristic. The line-crawling correction coefficient (LC) has been determined beforehand. Namely, light-receiving pixels having photosensitive characteristics substantially identical to each other are grouped, the arithmetic mean value of signals of the respective pixels in each group is determined, and the ratio between the arithmetic mean values of the respective groups is defined as the line-crawling correction coefficient (LC).

3 Claims, 8 Drawing Sheets

Fig.4

| | m=1 | m=2 | m=3 | m=4 | m=5 | m=6 | m=7 | m=8 | ... | m=M |
|---|---|---|---|---|---|---|---|---|---|---|
| n=1 | Cy / Mg | Ye / G | Cy / Mg | Ye / G | Cy / Mg | Ye / G | Cy / Mg | Ye / G | ... | Ye / Mg |
| n=2 | Cy / G | Ye / Mg | Cy / G | Ye / Mg | Cy / G | Ye / Mg | Cy / G | Ye / Mg | ... | Ye / Mg |
| n=3 | Cy / Mg | Ye / G | Cy / Mg | Ye / G | Cy / Mg | Ye / G | Cy / Mg | Ye / G | ... | Ye / Mg |
| n=4 | Cy / G | Ye / Mg | Cy / G | Ye / Mg | Cy / G | Ye / Mg | Cy / G | Ye / Mg | ... | Ye / Mg |
| ... | ... | ... | ... | ... | ... | ... | ... | ... | ... | ... |
| n=N | Cy / G | Ye / Mg | Cy / G | Ye / Mg | Cy / G | Ye / Mg | Cy / G | Ye / Mg | ... | Ye / Mg |

Fig.5

| | n=1 | n=2 | n=3 | n=4 | ... | n=N |
|---|---|---|---|---|---|---|
| m=1 (P1,1) | Cy+Mg | Cy+G | Cy+Mg | Cy+G | ... | Cy+G |
| m=2 (P1,2) | Ye+G | Ye+Mg | Ye+G | Ye+Mg | ... | Ye+Mg |
| m=3 (P1,3) | Cy+Mg | Cy+G | Cy+Mg | Cy+G | ... | Cy+G |
| m=4 (P1,4) | Ye+G | Ye+Mg | Ye+G | Ye+Mg | ... | Ye+Mg |
| m=5 (P1,5) | Cy+Mg | Cy+G | Cy+Mg | Cy+G | ... | Cy+G |
| m=6 (P1,6) | Ye+G | Ye+Mg | Ye+G | Ye+Mg | ... | Ye+Mg |
| m=7 (P1,7) | Cy+Mg | Cy+G | Cy+Mg | Cy+G | ... | Cy+G |
| m=8 (P1,8) | Ye+G | Ye+Mg | Ye+G | Ye+Mg | ... | Ye+Mg |
| ... | ... | ... | ... | ... | ... | ... |
| m=M (P1,M / PN,M) | Ye+G | Ye+Mg | Ye+G | Ye+Mg | ... | Ye+Mg |

Fig.6

| | m=1 | m=2 | m=3 | m=4 | m=5 | m=6 | ... | m=M-1 |
|---|---|---|---|---|---|---|---|---|
| n=1 | Y1,1 P1,1+P1,2 | Y1,2 P1,2+P1,3 | Y1,3 P1,3+P1,4 | Y1,4 P1,4+P1,5 | Y1,5 P1,5+P1,6 | Y1,6 P1,6+P1,7 | | Y1,M-1 P1,M-1+P1,M |
| n=2 | P2,1+P2,2 | P2,2+P2,3 | P2,3+P2,4 | P2,4+P2,5 | P2,5+P2,6 | P2,6+P2,7 | | P2,M-1+P2,M |
| n=3 | P3,1+P3,2 | P3,2+P3,3 | P3,3+P3,4 | P3,4+P3,5 | P3,5+P3,6 | P3,6+P3,7 | | P3,M-1+P3,M |
| n=4 | P4,1+P4,2 | P4,2+P4,3 | P4,3+P4,4 | P4,4+P4,5 | P4,5+P4,6 | P4,6+P4,7 | | P4,M-1+P4,M |
| ... | | | | | | | | |
| n=N | PN,1+PN,2 | PN,2+PN,3 | PN,3+PN,4 | PN,4+PN,5 | PN,5+PN,6 | PN,6+PN,7 | | YN-1,M-1 PN,M-1+PN,M |

IMAGING DEVICE UTILIZING A LINE-CRAWLING CORRECTION COEFFICIENT

BACKGROUND OF THE INVENTION

1. Field of the Invention

The present invention relates to an imaging device such as a digital camera for storing image data and the like and, in particular, to a method for eliminating line noise from the image data within the digital camera or from the image data transferred from the digital camera to a computer.

2. Related Background Art

Used in electronic imaging instruments of recent years are semiconductor imaging devices such as charge coupled solid-state imaging device and MOS solid-state imaging device which yield excellent effects in reducing the size and weight of the instruments.

In such an imaging device, a number of light-receiving pixels having a photoelectric converting function are arranged in a matrix, while color filters or the like in a Bayer array are disposed on the light-receiving surfaces of the respective light-receiving pixels, such that the light image of a subject transmitted through the color filters are photoelectrically converted by the light-receiving pixels, whereby color imaging is enabled.

SUMMARY OF THE INVENTION

The imaging device in accordance with the present invention multiplies luminance data obtained from image data of even lines or odd lines by a predetermined correction coefficient LC stored in a memory, thereby correcting the luminance of the image data. After the image data stored in the imaging device are transferred to a computer, they can also be corrected by the computer.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is an explanatory view for explaining a configuration of a color filter in a complementary-color checkered pattern;

FIG. 5 is an explanatory view for explaining the principle of pixel data formation in the electronic still camera in accordance with Embodiment 1;

FIG. 6 is an explanatory view for explaining the principle of luminance data formation in the electronic still camera in accordance with Embodiment 1;

DESCRIPTION OF THE PREFERRED EMBODIMENTS

(Embodiment 1)

Figure 1:
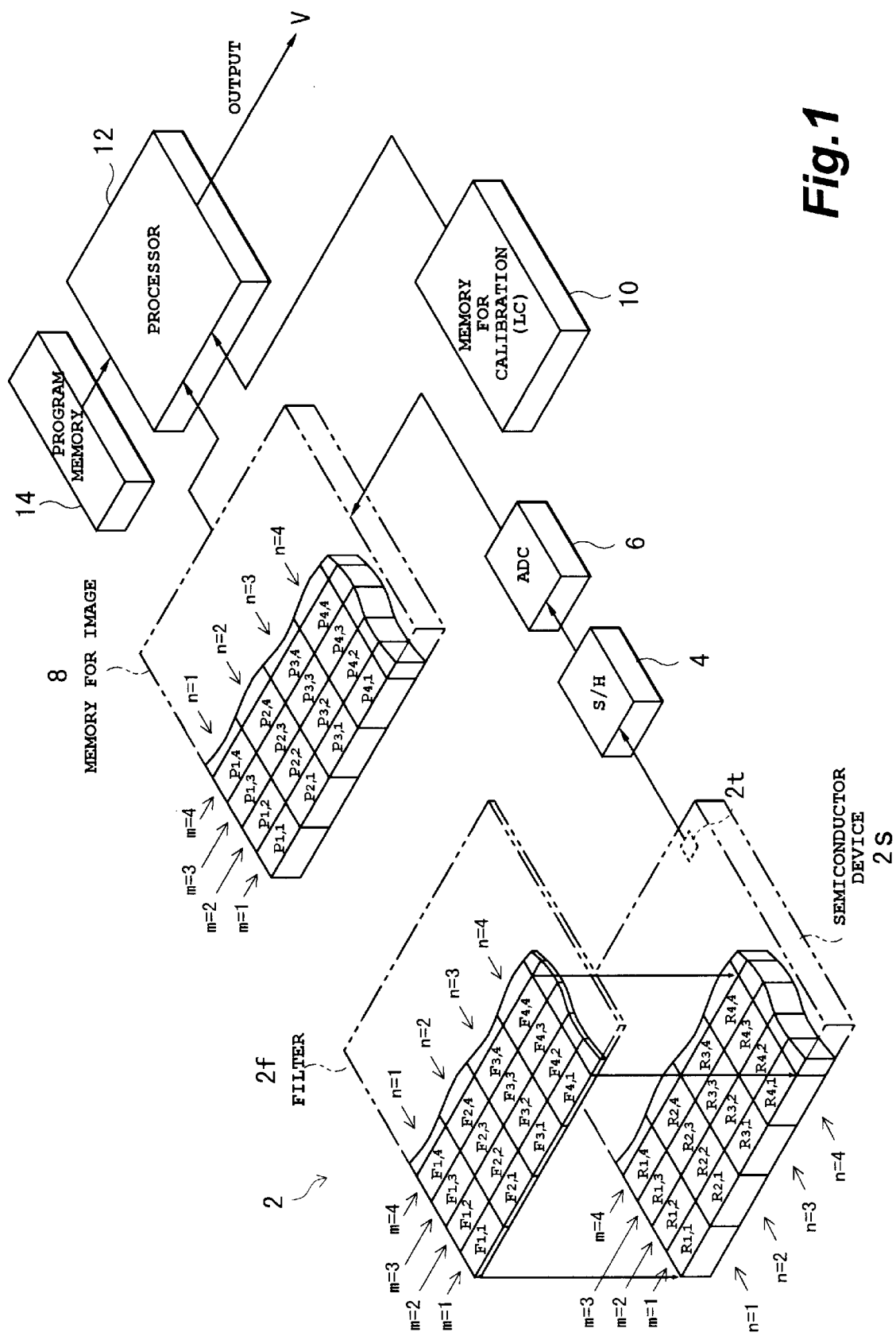
FIG. 1 is a view showing a configuration of an electronic still camera in accordance with Embodiment 1.

FIG. 1 is a view showing a system configuration of an electronic still camera as an imaging device. This camera comprises a CCD image sensor 2, a processor 12 electrically connected to the CCD imaging sensor 2, a first memory 8 electrically connected to the processor 12, and a second memory 10 which is electrically connected to the processor 12 and stores a correction coefficient LC beforehand.

The CCD image sensor 2 comprises a semiconductor device 2s and a color filter 2f disposed on the light-receiving area of the semiconductor device 2s. The semiconductor device 2s has a light-receiving area including a plurality of pixel regions $R_{1.1}$ to $R_{4.4}$ arranged in a matrix. The color filter 2f includes a plurality of filter regions $F_{1.1}$ to $F_{4.4}$ arranged in a matrix. The filter regions $F_{1.1}$ to $F_{4.4}$ are disposed so as to correspond to the pixel regions $R_{1.1}$ to $R_{4.4}$, respectively.

The first memory 8 is electrically connected to the processor 12, whereby data of the pixel regions $R_{1.1}$ to $R_{4.4}$ are respectively stored as pixel data $P_{1.1}$ to $P_{4.4}$. The second memory 10 is electrically connected to the processor 12 and stores the line-crawling correction coefficient LC beforehand.

The processor 12 multiplies luminance data $Y_{1.1}$ to $Y_{4.4}$ computed from the data $P_{1.1}$ to $P_{4.4}$ of the pixel regions $R_{1.1}$, to $R_{4.4}$ on even lines (n=EVEN) or odd lines (n=ODD) stored in the first memory 8 by the correction coefficient LC which has been stored in the second memory 10 beforehand, and then outputs the result thereof.

Figure 2:
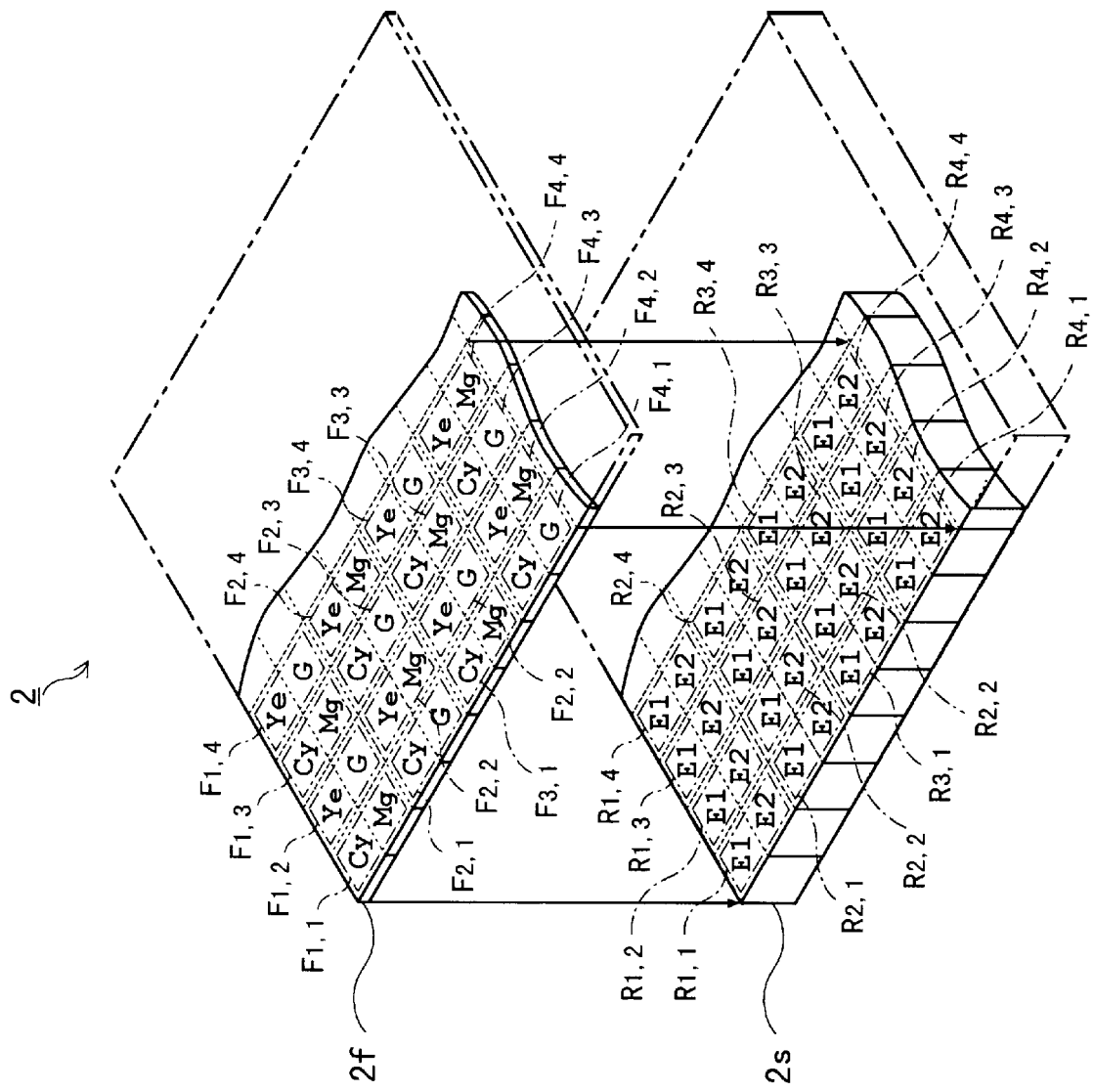
FIG. 2 is a view showing a CCD image sensor in detail.

FIG. 2 shows the CCD image sensor 2 in detail. Each of the pixel regions $R_{1.1}$ to $R_{4.4}$ has two pixel elements E1 and E2 adjacent to each other in the column direction. Each of the filter regions $F_{1.1}$ to $F_{4.4}$ has two filter regions F1 and F2 adjacent to each other in the column direction. The adjacent two filter elements (any two of Cy, Mg, Ye, and G) respectively have two kinds of colors selected from cyan (Cy), magenta (Mg), yellow (Ye), and green (G). These filter elements are disposed so as to correspond to the pixel elements E1 and E2, respectively.

In the following, the digital camera shown in FIGS. 1 and 2 will be explained in further detail with reference to FIGS. 3 to 6.

Figure 3:
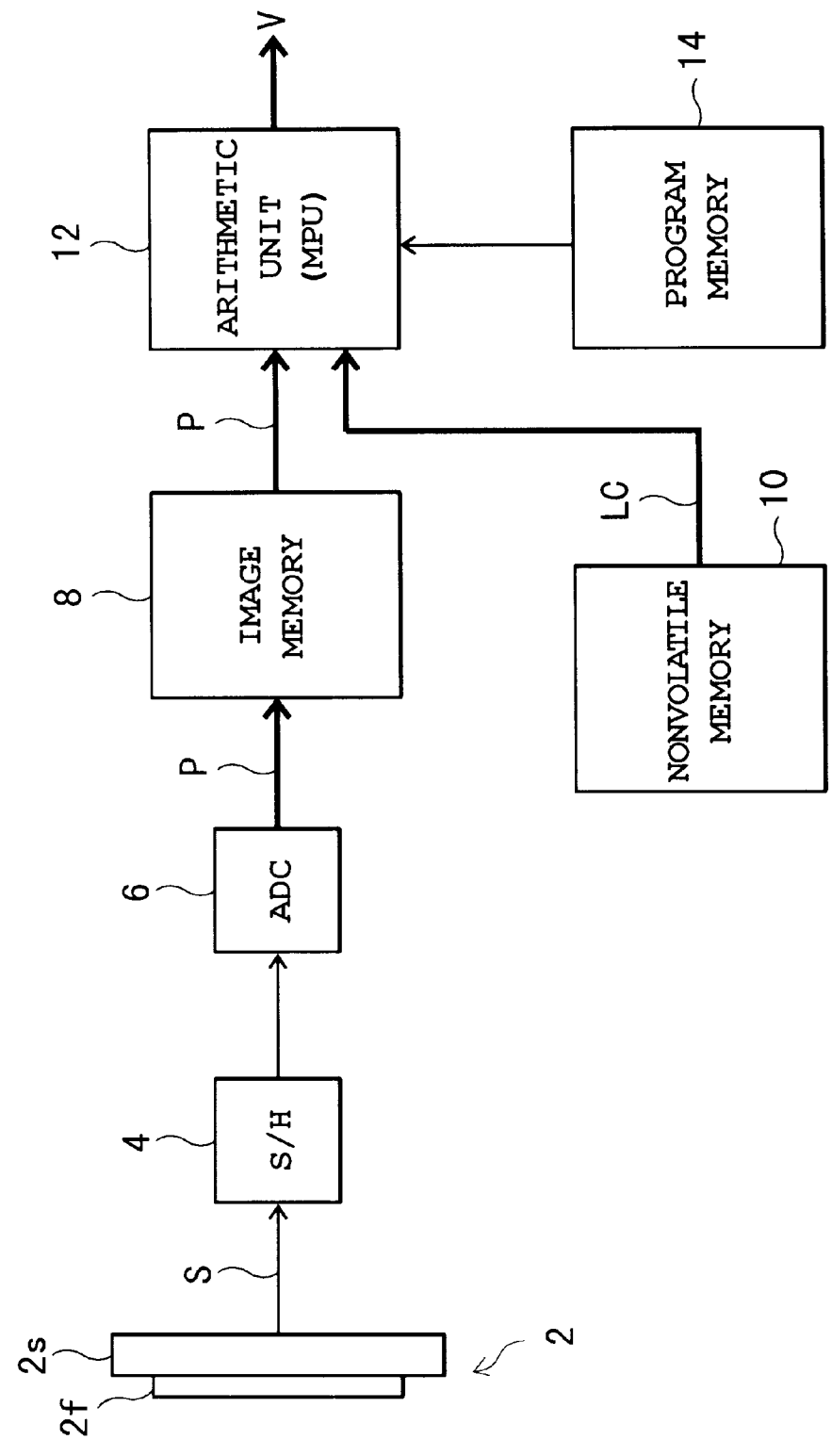
FIG. 3 is a block diagram showing the configuration of the electronic still camera in accordance with Embodiment 1.

FIGS. 1 and 3 schematically show the overall configuration of the electronic still camera. The two-dimensional color solid-state imaging device (referred to as "color CCD" hereinafter) 2 has an output contact 2t to which a sample-and-hold circuit 4 and A/D converter 6 are successively connected in series. Connected to an output contact of the A/D converter 6 is the image memory 8 comprising a so-called SRAM which stores data for at least one frame image. Connected to an output contact of the image memory 8 is the arithmetic unit (processor) 12 comprising a microprocessor (MPU) and the like. Further, connected to the arithmetic unit 12 are the nonvolatile memory 10 which has beforehand stored the line-crawling correction coefficient LC used in a line-crawling eliminating processing which will be explained later and a program memory 14 which has beforehand stored a program for the line-crawling eliminating processing.

In such a configuration, in synchronization with a non-depicted shutter release button being pushed, a number of light-receiving pixels disposed at the light-receiving area of the color CCD 2 two-dimensionally captures a still image corresponding to one frame picture. Simultaneously, pixel charges generated at the respective light-receiving pixels are scanned in a so-called dot sequential manner and read out, such that pixel signals S corresponding to the respective pixel charges are output in time series. Then, the sample-and-hold circuit 4 samples each pixel signal S; the A/D converter 6 digitizes thus sampled signals into pixel data P for the respective light-receiving pixels; and the image memory 8 stores the respective pixel data P so as to make them correspond to the light-receiving pixels arranged in the color CCD 2, thereby temporarily storing still image data corresponding to the above-mentioned one frame picture.

Further, as the arithmetic unit 12 reads out, for each pixel data P, the still image data temporarily stored in the image memory 8, it corrects thus read-out pixel data P on the basis of the line-crawling correction coefficient LC stored in the nonvolatile memory 10, so as to output pixel data V, from which line crawling has been eliminated, in response to the light-receiving pixels arranged in the above-mentioned color CCD 2. Then, the pixel data V are stored in a so-called semiconductor memory card or supplied to a display means such as monitor television, whereby the still image can be reproduced. Here, by executing a predetermined program in the program memory 14, the arithmetic unit 12 realizes a series of still image photographing processing from the starting of the two-dimensional imaging to the completion of output of the pixel data V.

In the following, the principle and operation of the above-mentioned line-crawling eliminating processing will be explained in detail with reference to FIGS. 4 to 6.

Disposed on the light-receiving surfaces of the light-receiving pixels E1 and E2 which are two-dimensionally formed in the color CCD 2 is the color filter 2f in which fine complementary color filters of cyan (Cy), yellow (Ye), magenta (Mg), and green (G) are arranged in a checkered pattern as shown in FIGS. 2 and 4. Namely, two of the fine complementary color filters Cy, Ye, Mg, and G are disposed so as to face to the respective light-receiving pixels E1 and E2 shown in FIG. 2. Accordingly, at the time of imaging, pixel charges corresponding to the fine complementary color filters Cy, Ye, Mg, and G are generated in the respective light-receiving pixels E1 and E2. Therefore, assuming that (2N×M) pieces of the light-receiving pixels E1 and E2 are provided as shown in FIG. 4, (2×N×M) pieces of pixel charges are generated.

On the other hand, when the color CCD 2 effects the above-mentioned dot sequential scanning and readout operation, it does not individually reads out the (2×N×M) pieces of pixel charges but mixes a pair of adjacent pixel charges in the column direction (longitudinal direction indicated by a variable m) as shown in FIG. 5 and then reads out the resulting mixed charge as a new individual charge. Accordingly, when the respective pixel signals S output from the color CCD 2 are expressed in a matrix array of N rows by M columns (i.e., array expressed by variables n and m having relationships of $1 \leq n \leq N$ and $1 \leq m \leq M$); in response to the respective fine complementary color filters, $S_{1,1}$=Cy+Mg, $S_{1,2}$=Ye+G, ..., $S_{1,M}$=Ye+G, $S_{2,1}$=Cy+G, $S_{2,2}$=Ye+Mg, ..., $S_{2,M}$=Ye+Mg, $S_{N,1}$=Cy+G, $S_{N,2}$=Ye+Mg, ..., and $S_{N,M}$=Ye+Mg, whereby the resolution in the row direction becomes half as much as that of the actual light-receiving pixels E1 and E2. Then, pixel data $P_{n,m}$ corresponding to these (N×M) pieces of the pixel signals $S_{n,m}$ are stored in the image memory 8 as well.

Thereafter, among the pixel data $P_{n,m}$ thus stored in the image memory 8, the pixel data adjacent to each other in each row n are added together so as to determine the luminance data Y corresponding to each light-receiving pixel. Namely, assuming that each pixel data and each luminance data in the individual row n are respectively $P_{n,m}$ and $Y_{n,m}$, an arithmetic operation represented by the expression $Y_{n,m}=P_{n,m}+P_{n,m+1}$ is performed. More specifically, the respective luminance data $Y_{n,m}$ which are obtained in response to the pixel data $P_{n,m}$ shown in FIG. 5 become $Y_{1,1}=P_{1,1}+P_{1,2}$, $Y_{1,2}=P_{1,2}+P_{1,3}$, ..., $Y_{1,M-1}=P_{1,M-1}+P_{1,M}$, $Y_{2,1}=P_{2,1}+P_{2,2}$, $Y_{2,2}=P_{2,2}+P_{2,3}$, ..., $Y_{2,M-1}=P_{2,M-1}+P_{2,M}$, ..., $Y_{N,1}=P_{N,1}+P_{N,2}$, $Y_{N,2}=P_{N,2}+P_{N,3}$, ..., and $Y_{N,M-1}=P_{N,M-1}+P_{N,M}$ as shown in FIG. 6. Thus, the respective luminance data $Y_{n,m}$ corresponding to N×(M−1) pieces of light-receiving pixels are determined.

Consequently, each luminance data corresponding to each light-receiving pixel corresponds to a mixed value of pixel charges generated in four pieces of light-receiving pixels adjacent to each other. Namely, pixel charges of cyan (Cy), yellow (Ye), magenta (Mg), and green (G) are inevitably mixed together therein. In a typical example explained with reference to the color filter array shown in FIG. 4, the luminance data $Y_{1,1}$ corresponding to the array (n,m)=(1,1) corresponds to the mixed value of Cy, Ye, Mg, and G pixel charges in the array of (1,1) and (1,2); while the luminance data $Y_{1,2}$ corresponding to the array (n,m)=(1,2) corresponds to the mixed value of Cy, Ye, Mg, and G pixel charges in the array of (1,2) and (1,3). Other luminance data are determined similarly.

Though the arithmetic technique for determining the individual luminance data $Y_{n,m}$ differs from that for determining a luminance signal Y in a typical television technology (i.e., Y=0.3R+0.59G+0.11B), the luminance data $Y_{n,m}$ becomes a value approximating the above-mentioned luminance signal Y.

Then, each of thus determined luminance data $Y_{n,m}$ is multiplied by the line-crawling correction coefficient LC read out from the nonvolatile memory 10 so as to effect a processing for eliminating line crawling.

This line-crawling correction coefficient LC has been determined beforehand according to the technique explained in the following. Namely, under a uniform light source with a predetermined color temperature assuming a standard photographing environment, a single-color subject with no pattern is captured by an electronic still camera having the same standard of characteristics as that of the electronic still camera in accordance with this embodiment. Then, based on the principle explained with reference to FIGS. 4 to 6, the individual luminance data $Y_{n,m}$ are determined. Thereafter, the arithmetic mean value of all the luminance data corresponding to odd rows n=1, 3, 5, 7, ..., are computed and defined as odd horizontal line luminance average value $YAV_{ODD}$.

$$YAV_{ODD} = \frac{1}{\left(\frac{N}{2}\right)} \times \frac{1}{M-1} \sum_{n=ODD}^{} \sum_{m=1}^{M-1} Y(n,m) \quad (1)$$

In the above expression (1), n=ODD indicates that n is a variable representing each odd row.

Further, the arithmetic mean value of all the luminance data corresponding to even rows n=2, 4, 6, 8, ..., are computed and defined as even horizontal line luminance average value $YAV_{EVEN}$.

$$YAV_{EVEN} = \frac{1}{\left(\frac{N}{2}\right)} \times \frac{1}{M-1} \sum_{n=EVEN} \sum_{m=1}^{M-1} Y(n,m) \quad (2)$$

In the above expression (2), n=EVEN indicates that n is a variable representing each even row.

Then, the ratio of the odd horizontal line luminance average value $YAV_{ODD}$ to the even horizontal line luminance average value $YAV_{EVEN}$ is defined as the line-crawling correction coefficient LC.

$$LC = \frac{YAV_{ODD}}{YAV_{EVEN}} \quad (3)$$

Namely, the line-crawling correction coefficient LC represents the relative ratio of the average photosensitive characteristic of the light-receiving pixel group corresponding to the odd rows to the average photosensitive characteristic of the light-receiving pixel group corresponding to the even rows in the color CCD 2.

Thus determined line-crawling correction coefficient LC is stored as a standard data in the nonvolatile memory 10 of each electronic still camera produced.

Turning back to the explanation of the line-crawling eliminating processing in the actual electronic still camera shown in FIG. 3, after the individual luminance data $Y_{n,m}$ is determined at the time of actual image capture as mentioned above, each of the respective luminance data corresponding to even rows n =2, 4, 6, 8, . . . , shown in FIG. 6 (indicated by "$Y_{EVEN\ n,m}$" hereinafter) is multiplied by the line-crawling correction coefficient LC; whereas the respective luminance data corresponding to odd rows n=1, 3, 5, 7, . . . , (indicated by "$Y_{ODD\ n,m}$" hereinafter) are left as they are without being multiplied by the line-crawling correction coefficient LC.

When each of the luminance data $Y_{EVEN\ n,m}$ corresponding to the even rows is multiplied by the line-crawing correction coefficient LC, the luminance level of each luminance data $Y_{EVEN\ n,m}$ is corrected with reference to the average photosensitive characteristic of the odd rows. On the other hand, the luminance data $Y_{ODD\ n,m}$ corresponding to the odd rows has already become a reference for the individual luminance data $Y_{EVEN\ n,m}$ without necessitating the correction by the line-crawling correction coefficient LC. Consequently, all the luminance data $Y_{n,m}$ in the odd and even rows are subjected to the line-crawling eliminating processing.

Then, the luminance data $Y_{n,m}$ after being subjected to the line-crawling eliminating processing is output as the pixel data V.

In the foregoing explanation, the elimination of line crawling as a whole is realized as the luminance data $Y_{EVEN\ n,m}$ corresponding to the even rows are multiplied by the line-crawling correction coefficient LC with reference to the luminance data $Y_{ODD\ n,m}$ corresponding to the odd rows. Contrarily, the luminance data $Y_{ODD\ n,m}$ corresponding to the odd rows may be divided by the line-crawling correction coefficient LC with reference to the luminance data $Y_{EVEN\ n,m}$ corresponding to the even rows, so as to eliminate line crawling as a whole. Also, instead of being divided by the line-crawling correction coefficient LC, the luminance data $Y_{ODD\ n,m}$ corresponding to the odd rows may be multiplied by the value of 1/LC which is used as a line-crawling correction coefficient.

Also, in the foregoing, as explained with reference to expressions (1) to (3), the luminance data $Y_{n,m}$ are obtained, and then the line-crawling correction coefficient LC is determined from the ratio of the odd horizontal line luminance average value $YAV_{ODD}$ to the even horizontal line luminance average value $YAV_{EVEN}$. Alternatively, the odd horizontal line luminance average value $YAV_{ODD}$ and the even horizontal line luminance average value $YAV_{EVEN}$ may be directly obtained from the pixel data $P_{1,1}$ to $P_{N,M}$ explained with reference to FIG. 5 so as to determine the line-crawling correction coefficient LC. That is, the line-crawling correction coefficient LC may be determined by an algorithm which is substantially the same as that of the above expression (1) or (3).

Thus, in this embodiment, line crawling is prevented from occurring due to fluctuation in photosensitive characteristics among pixels of the color CCD 2, whereby still images with a high image quality can be provided. Accordingly, this embodiment yields excellent effects when applied to an electronic still camera. Also, high-definition moving pictures can be provided when this embodiment is applied to cameras for capturing moving pictures, such as digital video cameras.

Also, since line crawling is favorably eliminated, unlike the prior art, various kinds of image processing can be effected without deteriorating the image quality.

Further, since the line-crawling eliminating processing is effected by a programmed arithmetic processing, an electronic still camera allowing high-definition still images to be photographed can be provided without any specific hardware being added thereto.

Also, since the arithmetic processing for eliminating line crawling is performed by the line-crawling correction coefficient LC which has been stored beforehand, a number of excellent effects such as capability of high-speed processing can be yielded.

(Embodiment 2)

In the following, another embodiment will be explained with reference to FIG. 7. This embodiment relates to an electronic still camera. The parts in FIG. 7 identical or corresponding to those in FIG. 1 will be referred to with marks identical to those of FIG. 1.

Figure 7:
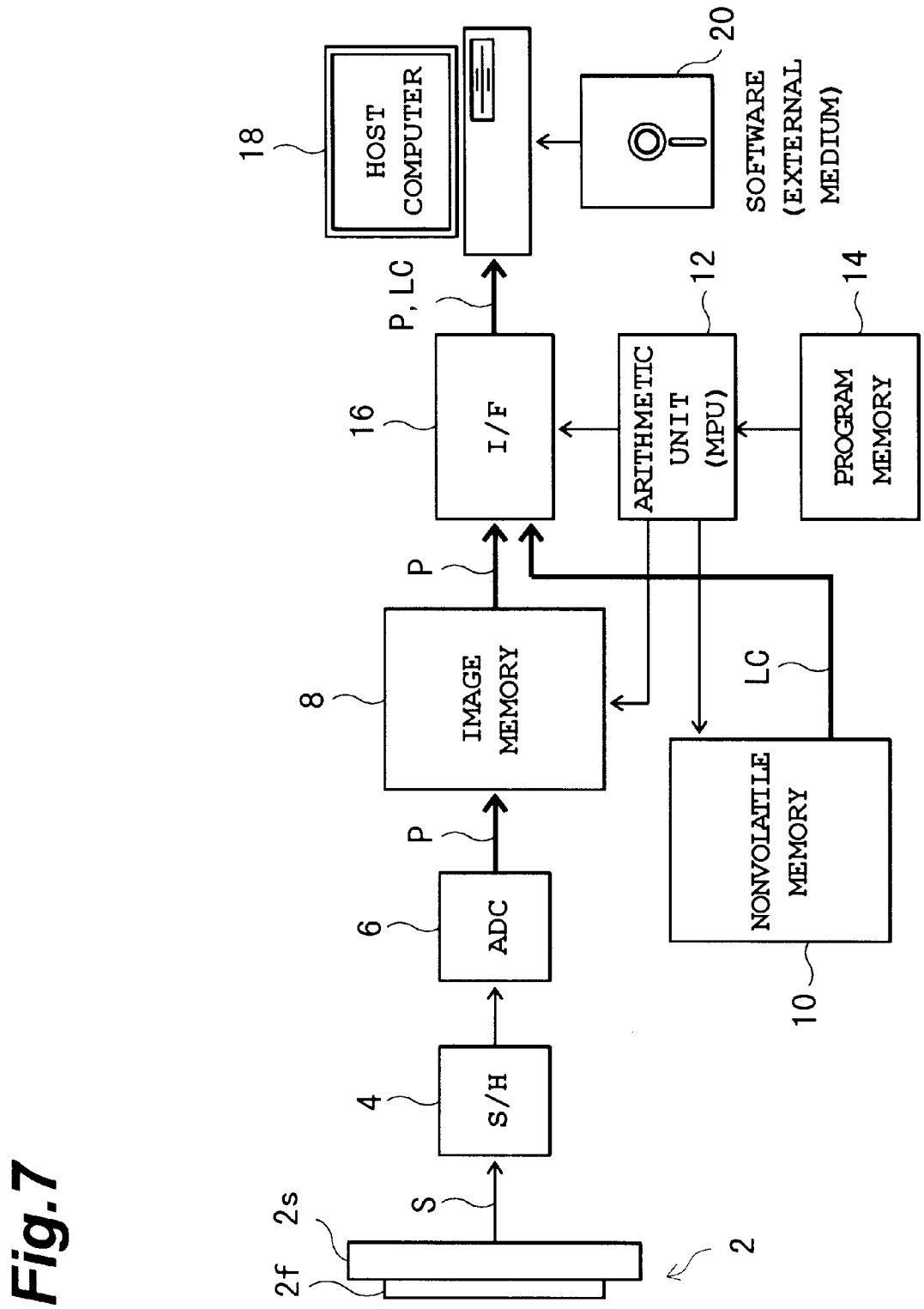
FIG. 7 is a block diagram for explaining a configuration of an electronic still camera and external instruments in accordance with Embodiment 2.

In FIG. 7, this electronic still camera has a configuration in which, as with Embodiment 1, the pixel signal S output from the color CCD 2 by dot sequential scanning is digitally converted into the pixel data P by means of the sample-and-hold circuit 4 and A/D converter 6 so as to be stored in the image memory 8. This electronic still camera further comprises the nonvolatile memory 10 for storing the line-crawling correction coefficient LC beforehand, the arithmetic unit 12 with the microprocessor MPU, the program memory 14 for storing a predetermined program beforehand, and an interface circuit 16 by which the electronic still camera can be connected to an external host computer 18 such as so-called personal computer so that various kinds of data can be exchanged therebetween and so forth.

Here, the arithmetic unit 12 controls the interface circuit 16 on the basis of a communication program which has been stored in the program memory 14 beforehand, thereby causing data to be exchanged between the electronic still camera and the external host computer 18.

The external host computer 18 stores the so-called communication program for performing the above-mentioned data exchange with the electronic still camera, the processing program for line-crawling eliminating processing explained in Embodiment 1, as well as various kinds of image processing programs necessary for reproducing images. These programs are supplied by an external storage medium 20 such as floppy disk FD and compact disk CD and are stored into the external host computer 18 after their predetermined installation processing is executed.

In the following, the action in Embodiment 2 having such a configuration will be explained.

After the color CCD 2 starts capturing a still image in synchronization with operation of the shutter release button (not depicted), the pixel signal S is output from the color CCD 2 by dot sequential scanning, while the pixel signal S is digitally converted into the pixel data P by the sample-and-hold circuit 4 and the A/D converter 6 so as to be stored in the image memory 8. Accordingly, as shown in FIG. 5, the individual pixel data $P_{n,m}$ are stored in the image memory 8 so as to correspond to the array (n,m). Also, at the time of image capture, only a processing for storing the pixel data $P_{n,m}$ into the image memory 8 is effected.

After the pixel data $P_{n,m}$ are thus stored in the image memory 8, when a user or the like manipulates a predetermined operation button attached to this electronic still camera or instructs, by way of the external host computer 18, the electronic still camera to reproduce an image, the arithmetic unit 12 detects such manipulation or instruction and causes the pixel data $P_{n,m}$ in the image memory 8 and the line-crawling correction coefficient LC to be transferred to the external host computer 16 by way of the interface circuit 16.

Due to such a transfer processing, the pixel data $P_{n,m}$ and the line-crawling correction coefficient LC are stored in the external host computer 18. By performing the arithmetic operation of luminance data explained with reference to FIG. 6, the external host computer 18 obtains the luminance data $Y_{n,m}$ based on the pixel data $P_{n,m}$. Further, it executes a processing program for a line-crawling eliminating processing, so as to multiply the luminance data $Y_{n,m}$ by the line-crawling correction coefficient LC as explained in Embodiment 1, for example, thereby obtaining luminance data which can eliminate line crawling. Then, various kinds of image processing are effected on the basis of thus corrected luminance data, and then the image data obtained after the image processing are supplied to a monitor or the like so as to reproduce and display the still image.

Thus, in this embodiment, since the program for line-crawling eliminating processing is held by the external host computer 18, the load of storing programs on the electronic still camera side can be alleviated and, more specifically, the storage capacity of the program memory 14 can be reduced.

Also, various kinds of image processing can be effected in the external host computer 18, whereby this embodiment can yield such effects as capability of realizing broad applications in the field of so-called computer graphics.

In this embodiment, explained is a case where a processing program for line-crawling processing is not stored in the program memory 14. Nevertheless, both of such a processing program and the above-mentioned communication program may be stored in the program memory 14 beforehand such that the line-crawling eliminating processing can be effected within the electronic still camera or in the external host computer 18 as the user or the like selects one of them.

As explained in the foregoing, in this embodiment, provided is a camera kit comprising a digital camera (electronic still camera) connectable to the computer 18) and the recording medium 20 storing a program which can be read out by the computer 18.

In this camera, as the program of the recording medium 20 is installed in the computer 18, the latter multiplies the luminance data $Y_{1,1}$ to $Y_{4,4}$, which are computed from the data $P_{1,1}$ to $P_{4,4}$ of the above-mentioned pixel regions $R_{1,1}$ to $R_{4,4}$ on the even or odd rows stored in the first memory 8, by the correction coefficient LC stored in the second memory 10 beforehand. Consequently, line noise in image data is eliminated.

(Embodiment 3)

Figure 8:
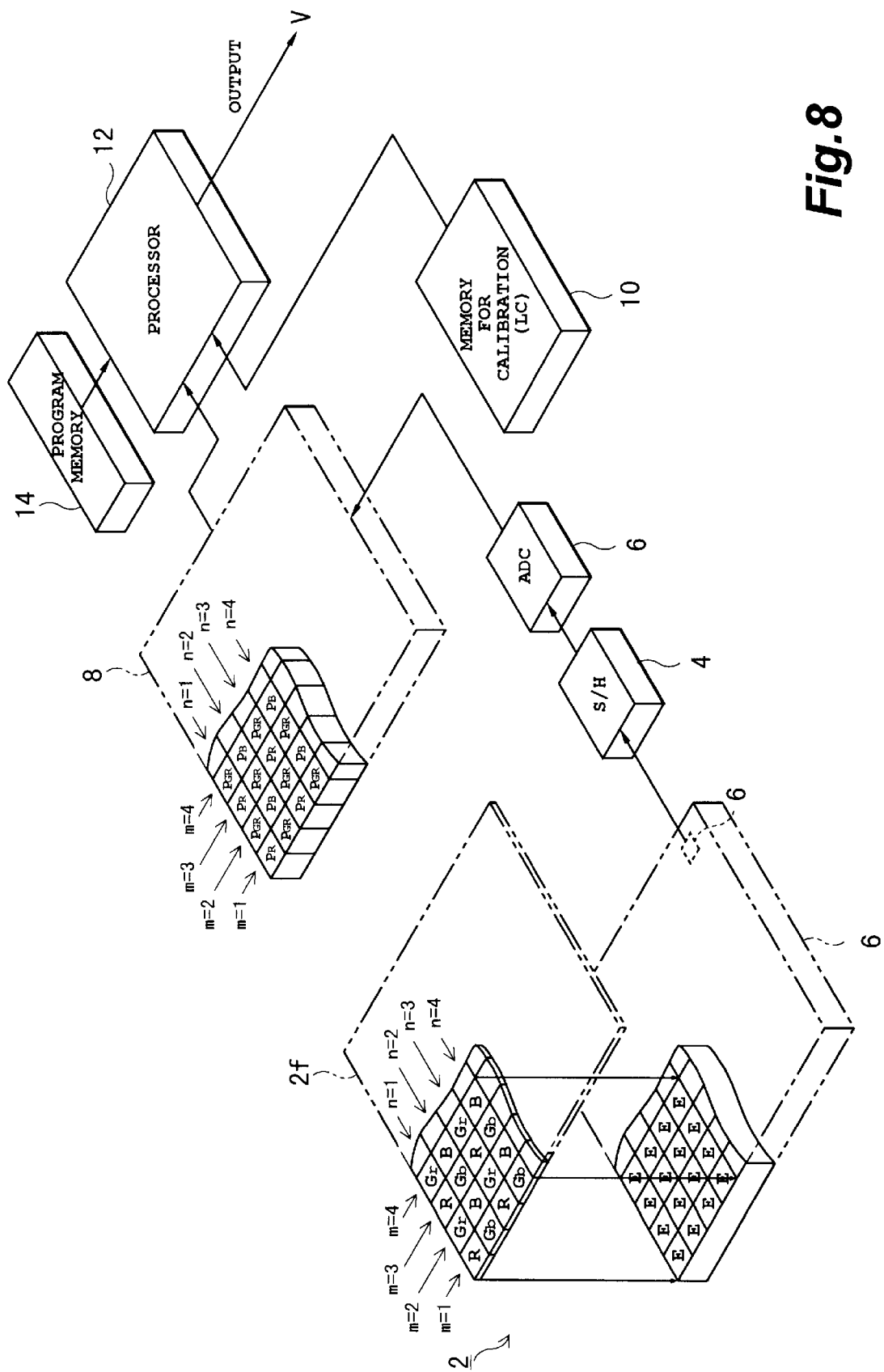
FIG. 8 is an explanatory view for showing a system configuration of a camera using a color filter of primary-color Bayer array.

In addition to the electronic still cameras utilizing the color CCD 2 adopting the complementary-color checkered pattern explained in the foregoing Embodiments 1 and 2, as another embodiment, a case where an imaging device adopting a color filter of red (R), green (G), and blue (B) primary-color Bayer array as shown in FIG. 8 is used will be explained. Also, in the row direction (horizontal direction), green (G) adjacent to red (R) is referred to as (Gr), while green (G) adjacent to blue (B) is referred to as (Gb). Here, the electronic still camera has a configuration similar to that of FIG. 1, and its detailed explanation will not be repeated. The configuration shown in FIG. 8 can also be applied to the imaging device shown in FIG. 7.

The line crawling in the imaging device of primary-color Bayer array mainly occurs due to differences in pixel charges generated in the light-receiving pixels having fine color filters of green (Gb) and (Gr). Namely, it results from the difference in pixel charges between the light-receiving pixels respectively corresponding to green (Gr) disposed on the same horizontal pixel row as red (R) and green (Gb) disposed on the same horizontal pixel row as blue (B).

Also, in the case of a color CCD adopting a primary-color Bayer array, unlike the color CCD adopting the complementary-color checkered pattern, in place of a technique in which two adjacent columns of pixel charges are output as being added together, adopted is a so-called all pixel readout system in which pixel signals corresponding to individual light-receiving pixels one by one are output.

The camera in this embodiment comprises the CCD image sensor 2, the processor 12 electrically connected to the CCD image sensor 2, the first memory 8 electrically connected to the processor 12, and the second memory 10 which is electrically connected to the processor 12 and stores the correction coefficient LC beforehand.

The CCD image sensor 2 comprises the semiconductor device 2s having a light-receiving area which includes a plurality of pixel elements E arranged in a matrix of n rows by m columns and the color filter 2f which includes a plurality of filter elements R, G (Gr, Gb), and B arranged in a matrix of n rows by m columns. The color of each filter element is selected from one of red (R), green (G), and blue (B).

On each of the odd rows (n=ODD) of the color filter 2f, red filter elements (R) and green filter elements (G) are alternately disposed. On each of the even rows (n=EVEN) of the color filter 2f, green filter elements (G) and blue filter elements (B) are alternately disposed. The color filter 2f is disposed on the light-receiving area of the semiconductor device 2s, while the filter elements R, G, and B are disposed so as to correspond to the respective pixel elements E. This camera comprises the processor 12 electrically connected to the CCD image sensor 2, the first memory 8 which is electrically connected to the processor 12 and adapted to store the data P of the pixel element E, and the second memory 10 which is electrically connected to the processor 12 and stores the correction coefficient LC beforehand.

The processor 12 multiplies the data P of the pixel element E on the even rows or odd rows stored in the first memory 8 by the correction coefficient LC stored beforehand in the second memory 10, and outputs the result thereof.

Arithmetic mean value $Gr_{AV}$ of the whole pixel data $P_{Gr}$ corresponding to green (Gr) and arithmetic mean value $Gb_{AV}$ of the whole pixel data $P_{Gb}$ corresponding to green (Gb) are obtained at the time of image capture using a uniform light source. Then, as shown in the following operation expression, the ratio of the arithmetic mean value $Gr_{AV}$ to the arithmetic mean value $Gb_{AV}$ is determined as the line-crawling correction coefficient LC, and the latter is stored in the predetermined nonvolatile memory 10.

$$LC = Gr_{AV}/Gb_{AV}$$

Then, each pixel data $P_{Gb}$ corresponding to green (Gb) obtained by actual image capture is multiplied by this line-crawling correction coefficient LC, while each pixel data $P_{Gr}$ corresponding to green (Gr) is left as it is, whereby line crawling as a whole is eliminated.

Though such a line-crawling correction coefficient is based on green (Gr), it may be based on green (Gb). In this case, each pixel data $P_{Gr}$ corresponding to green (Gr) obtained by the actual image capture is divided by the line-crawling correction coefficient LC or multiplied by a coefficient of 1/LC.

Thus, the present invention can eliminate line crawling also when a Bayer array is adopted, whereby it is effective in providing high-definition images and so forth.

Though Embodiments 1 to 3 represent the case where the line crawling correction coefficient LC is determined on the basis of the pixel data obtained from all the light-receiving pixels of the imaging device, it may be determined on the basis of the pixel data obtained from a light-receiving pixel corresponding to a specific partial light-receiving area in the light-receiving area of the imaging device. For example, the line crawling correction coefficient LC may be determined on the basis of the pixel data obtained from light-receiving pixels which exist within a predetermined range from the center of the light-receiving area.

Though Embodiments 1 to 3 explain cases of complementary-color checkered pattern array and primary-color Bayer array, the present invention can also be applied to other kinds of color filter arrays and line sensors used in image scanners and the like when the modes of generation of line crawling are grasped and the line-crawling correction coefficient is derived therefrom in a form corresponding to each mode. Namely, in a case where the photosensitive characteristic of the light-receiving pixel of the imaging device, including line sensor as well, is not uniform due to the color filter or the like, as with the foregoing embodiments, modes of generation of line crawling such as a mode where the luminance signal level becomes nonuniform are grasped. Then, the light-receiving pixels are grouped into those each having substantially the same photosensitivity, and the arithmetic mean value of the signals obtained from the light-receiving pixels of each group is determined. The ratio between thus determined arithmetic mean values is defined as the line-crawling correction coefficient for eliminating line crawling, whereby the present invention can be applied to the line-crawling elimination in various kinds of imaging devices.

In the following, advantages of the present invention will be explained. Conventionally, since the light-transmitting wavelength characteristics of individual fine color filters disposed so as to correspond to the respective light-receiving pixels differ from each other, signals output from the respective light-receiving pixels have yielded different levels even when an image of a single-color subject with no pattern is captured. Consequently, a stripe pattern resulting from these differences in level has occurred in the reproduced image, thereby deteriorating color reproducibility.

In the case where the photosensitive characteristics (photoelectric conversion characteristics) of the respective light-receiving pixels among a number of light-receiving pixels excluding the color filter are uniform, when an image of a single-color subject with no pattern is captured, the signals output from the respective light-receiving pixels intrinsically have a constant level. In a color imaging device, however, a color filter of a primary-color Bayer array comprising fine color filter groups of red (R), green (G), and blue (B) is disposed on the light-receiving surface of the above-mentioned number of light-receiving pixels, and light with a long wavelength passing through the fine color filter of red (R), in particular, reaches a deep part of the light-receiving pixel. Accordingly, the pixel charge generated in this deep part may leak into the adjacent other light-receiving pixels and the like, thereby forming noise, which is then mixed with pixel charges generated in the light-receiving pixels having fine color filters of blue (B) or green (G) and so forth. Therefore, even when an image of a single-color subject with no pattern is captured, the photosensitive characteristics of the respective light-receiving pixels may become substantially nonuniform, whereby the reproduced image may not be patternless and single-colored.

Due to such a phenomenon, line crawling where horizontal stripes occur in the reproduced image may become a serious problem. In particular, this line crawling may be remarkably recognized with eyes in the case of still image capture.

Also, such a phenomenon may occur not only in color filters of primary-color Bayer array but also in color filters of other color arrays.

Further, even when a contour-enhancing processing or the like is effected in order to improve the quality of a reproduced image in a state where the photosensitive characteristics of the light-receiving pixels have become substantially nonuniform due to such a phenomenon, the image quality may not be improved as can be expected.

In accordance with the present invention, by contrast, light-receiving pixels having photosensitive characteristics substantially identical to each other are grouped, the arithmetic mean value of signals of the respective pixels in each group is determined, and the ratio between the arithmetic mean values of the respective groups is defined as a line-crawling correction coefficient, and the level of signal output from each light-receiving pixel is corrected on the basis of this line-crawling correction coefficient. Accordingly, even when the photosensitive characteristics of the light-receiving pixels differ from each other due to the color filter or the like, the levels of signals output from the respective light-receiving pixels can substantially uniform the photosensitive characteristics by means of the above-mentioned line-crawling correction coefficient. Accordingly, line crawling is prevented from occurring in the reproduced image, whereby a high-definition image can be provided. In particular, the present invention can yield excellent effects when applied to an electronic still camera or the like which captures still images.

Also, in accordance with the present invention, in a line noise eliminating method for an imaging device having a light-receiving area in which a color filter of a predetermined array is attached to a plurality of light-receiving pixels; a plurality of light-receiving pixels existing in the light-receiving area or a predetermined region within the light-receiving area may be divided into a plurality of groups each comprising light-receiving pixels with photosensitive characteristics substantially identical to each other; the arithmetic mean value of signals output from the light-receiving pixels may be determined in each of the groups; with reference to a specific arithmetic mean value determined for a specific group in the groups, the ratio of the arithmetic mean value determined for each of the remaining groups may be obtained as a line-crawling correction coefficient; and the signal output from the light-receiving pixels corresponding to each of the remaining groups may be corrected on the basis of the line-crawling correction coefficient.

Also, in a line noise eliminating apparatus for an imaging device having a light-receiving area in which a color filter of a predetermined array is attached to a plurality of light-receiving pixels; there may be provided a storage means for storing, beforehand, data which is obtained by a process comprising the steps of dividing a plurality of light-receiving pixels existing in the light-receiving area or a predetermined region within the light-receiving area into a plurality of groups each comprising light-receiving pixels with photosensitive characteristics substantially identical to each other, determining the arithmetic mean value of signals output from the light-receiving pixels in each of the groups, and then yielding as a line-crawling correction coefficient, with reference to a specific arithmetic mean value determined for a specific group in the groups, the ratio of the arithmetic mean value determined for each of the remaining groups; and an arithmetic means for correcting, on the basis of the line-crawling correction coefficient in the storage means, the signal output upon actual imaging by the imaging device.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 043422/1996 filed on Feb. 29, 1996 is hereby incorporated by reference.

What is claimed is:

1. An imaging device comprising:

(A) a CCD image sensor having a color filter and a plurality of pixels arranged in a matrix disposed opposite said color filter, data from said plurality of pixels forming image data;

(B) a first memory adapted to store said image data from said CCD image sensor;

(C) a second memory adapted to store a correction coefficient LC, whereby said LC is derived from a luminance data matrix consisting of a plurality of luminance data, each said luminance datum consisting of the summation of said image data of four adjacent said pixels, and LC further satisfies the following equation, $$LC = YAV_{ODD}/YAV_{EVEN}$$

where $YAV_{ODD}$ is an odd horizontal line luminance average value of said luminance data matrix, and $YAV_{EVEN}$ is an even horizontal line luminance average value of said luminance data matrix; and (D) a processing unit electrically connected to said CCD image sensor, said first memory, and said second memory, wherein said processing unit utilizes said correction coefficient LC stored in said second memory to correct said image data stored in said first memory.

2. An imaging device according to claim 1 wherein said processing unit corrects each of said luminance data corresponding to even rows of said luminance data matrix by multiplying said luminance data by LC.

3. An imaging device according to claim 1 said imaging device being electrically connectable to a host computer.

* * * * *